United States Patent [19]
Hunt

[11] Patent Number: 5,967,391
[45] Date of Patent: Oct. 19, 1999

[54] GAME CALL HOLDER

[76] Inventor: Charles D. Hunt, 4326 Enyart, Brookline, Mo. 65619

[21] Appl. No.: 08/927,147

[22] Filed: Sep. 3, 1997

[51] Int. Cl.[6] .................................................. A45C 13/30
[52] U.S. Cl. ........................................... 224/222; 224/267
[58] Field of Search .................... 224/222, 219, 224/223, 221, 267, 750, 910

[56] References Cited

U.S. PATENT DOCUMENTS

| | | | |
|---|---|---|---|
| 4,061,256 | 12/1977 | Beer et al. | 224/219 |
| 4,069,954 | 1/1978 | Rauch | 224/223 |
| 4,733,808 | 3/1988 | Turner, Jr. et al. | 224/267 |
| 4,883,171 | 11/1989 | Carlton | 206/315.11 |
| 5,111,981 | 5/1992 | Allen | 224/202 |
| 5,154,506 | 10/1992 | Leard | 224/222 |
| 5,199,621 | 4/1993 | McLennan | 224/223 |
| 5,244,430 | 9/1993 | Legursky | 446/397 |
| 5,271,176 | 12/1993 | Anderson et al. | 224/219 |
| 5,607,091 | 3/1997 | Musacchia | 224/222 |

*Primary Examiner*—David J. Walczak
*Attorney, Agent, or Firm*—Lathrop & Gage, L.C.; Joselyn Johnson; William Ruby

[57] ABSTRACT

An apparatus for securing a flexible tube-shaped game call about the upper arm of the user in a fashion which allows the user to operate the game call without using his or her hands and without taking his or her eyes off of the target. The game call is comprised of a resilient band which encircles the user's arm. Securing loops are fixed to the outer surface of the resilient band and receive and secure the game call. When the user raises his or her arm to sight a gun or pull back a bowstring, the game call is positioned in front of the user's mouth thereby allowing the user to operate the call with little effort. This invention eliminates dangerous securing devices which are generally used to hang the game call about the user's neck, from the user's body or from the user's weapon.

11 Claims, 3 Drawing Sheets

GAME CALL HOLDER

BACKGROUND OF THE INVENTION

1. Field of the Invention.

The present invention relates to a device for securing a game call securely in close proximity to the user's mouth both for convenience and safety. The game call holder is a band of resilient material, such as elastic, which is provided with at least two securing loops. The band is slid onto the upper arm of the user and a tubular game call is secured in the securing loops in a manner which places the mouthpiece of the call directly in front of the user's mouth when the user raises the arm, such as when sighting a gun or pulling back the string on a hunting bow.

2. Prior Art

The invention relates to the art of securing an air-operated game call in a safe and convenient position on a hunter's body. Game calls have long been used by hunters to attract particular animals into shooting range. Calls are also used by photographers, bird watchers and other sporting enthusiast. Of the several available game calls, air-powered calls of tube-like configuration are probably the easiest to use but do require the use of at least one hand to operate. This generally means that a hunter using a tube-like call will have not have both hands available to aim a gun or pull back a bow.

Safety is always a primary consideration when hunting. Generally, game calls are suspended by a lanyard about the hunter's neck. When the hunter desires to activate the call, the call is picked up and placed in the mouth. A safety problem occurs in this situation as the lanyard suspending the call is prone to snagging the hunter's gun or bow. Of particular concern is the entanglement of the lanyard with the string of a hunting bow immediately prior to release. Several documented hunting injuries have occurred when a game call lanyard has tangled with a hunter's rifle or bow.

A game call holder is disclosed in U.S. Pat. No. 5,111,981 which apparently allows a game call to be positioned on the user's shoulder thereby freeing up his or her hands. However, the referenced patent requires the user to turn his head to use the call. It is desirable to have a game call positioned so that the hunter can simultaneously sight her weapon and activate the game call. Further, the referenced patent has multiple components and will require the user to manipulate the holder into a comfortable and usable position. It is desirable to have a game call holder of simple design which is easy to use and which is durable and inexpensive.

Accordingly, it is the object of this invention to provide a game call holder which allows the game call to be positioned in close proximity to the user's mouth for simultaneous activation of the call and sighting of a weapon. The invention will allow hands-free operation of the call and will allow the user to focus on the animal and on aiming the weapon.

Another object of this invention is to provide a new and improved game call holder which allows safe and easy access to the game call while hunting by eliminating a lanyard, or other attachment means, and by positioning the call away from the weapon.

Yet another object of this invention is to provide a game call which is easy to use as it requires the user to place a resilient band over his or her upper arm and then fasten the game call in the securing loops provided. The invention eliminates any buckles, hook and loop fasteners, clips, snaps or buttons found in the prior art. Further, the invention will be durable and relatively inexpensive.

SUMMARY OF THE INVENTION

The game call holder of the present invention is comprised of a resilient band of a predetermined size which is further provided with at least two securing loops on the outer surface. The resilient band is made of a stretchable fabric, such as elastic, and is formed in a generally annular configuration of sufficient size to slide over a person's upper arm without cutting off blood circulation. The resilient band has an inner surface which is proximate to the user's arm and an outer surface. At least two securing loops are formed on the outer surface in a predetermined configuration adapted to receive a tube-like game call.

The resilient band is ambidextrously fashioned for use by both right-handed and left-handed persons. The resilient band is placed on the upper arm, or biceps region, of the user. A tube-like game call is positioned in the securing loops provided in a manner which positions the game call in close proximity to the user's mouth. Further, the game call is moved even closer to the user's mouth when the arm fitted with the resilient band is raised to sight a gun or bow and arrow.

The invention eliminates lanyards, buttons, clips, hook and loop fasteners and all other attachment means which can become tangled with a hunter's weapon or which can break or malfunction during use. The invention is simple, practical and effective.

DESCRIPTION OF THE PREFERRED EMBODIMENT

Figure 1:
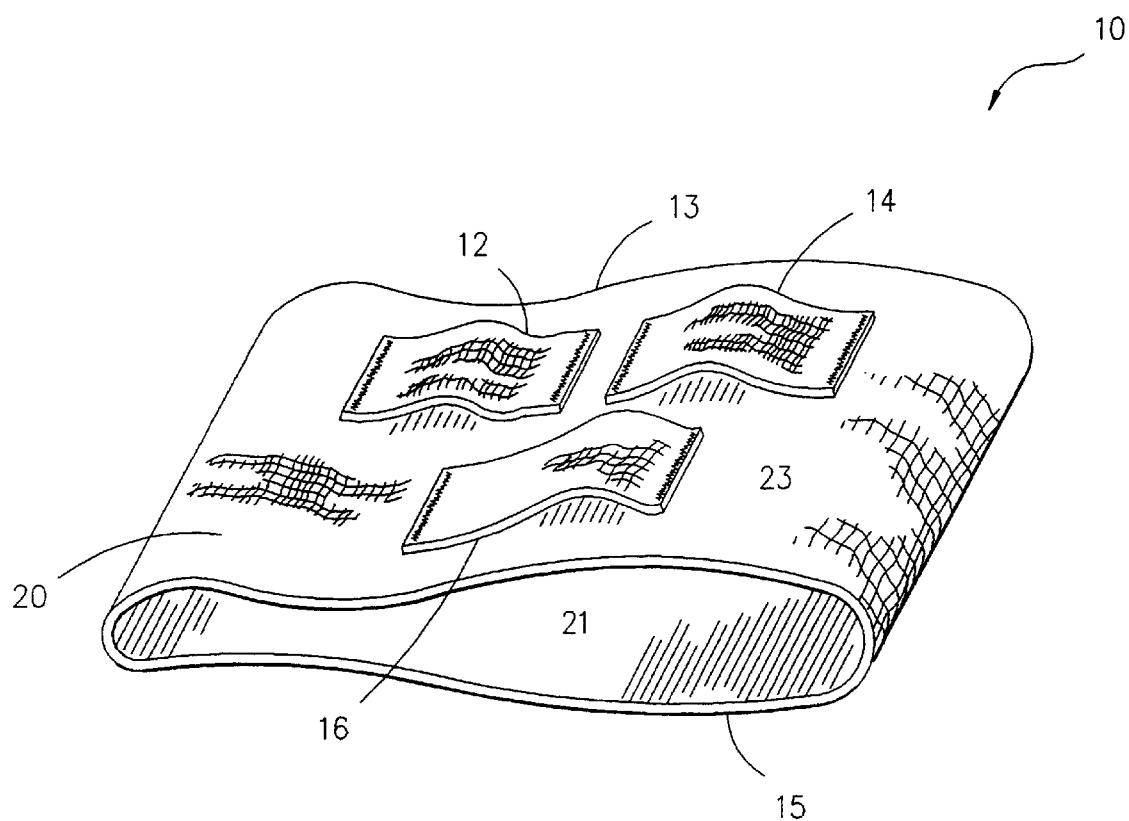
FIG. 1 is an overall view of the game call holder showing the preferred placement of the securing loops.

Referring to the drawings in detail, FIG. 1 illustrates an overall view of a game call holder 10 comprised of a resilient band 20 further having a first securing loop 12, a second securing loop 14 and a third securing loop 16. The resilient band 10 is substantially annular and has a first edge 13, a second edge 15, an inner surface 21 and an outer surface 23. Further, the resilient band 20 is formed of a stretchable material in a predetermined size sufficient to receive the upper arm of a user without cutting off blood circulation.

The first securing loop 12 and the second securing loop are positioned on the outer surface 23 of the resilient band 20 and aligned substantially horizontal and parallel to the first edge 13. The third securing loop 16 is positioned on the outer surface 23 and centered horizontally between and parallel to the first securing loop 12 and second securing loop 14 proximate to the second edge 15. The positioning of the first securing loop 12 and the second securing loop 14 allow ambidextrous use of the invention.

Figure 2:
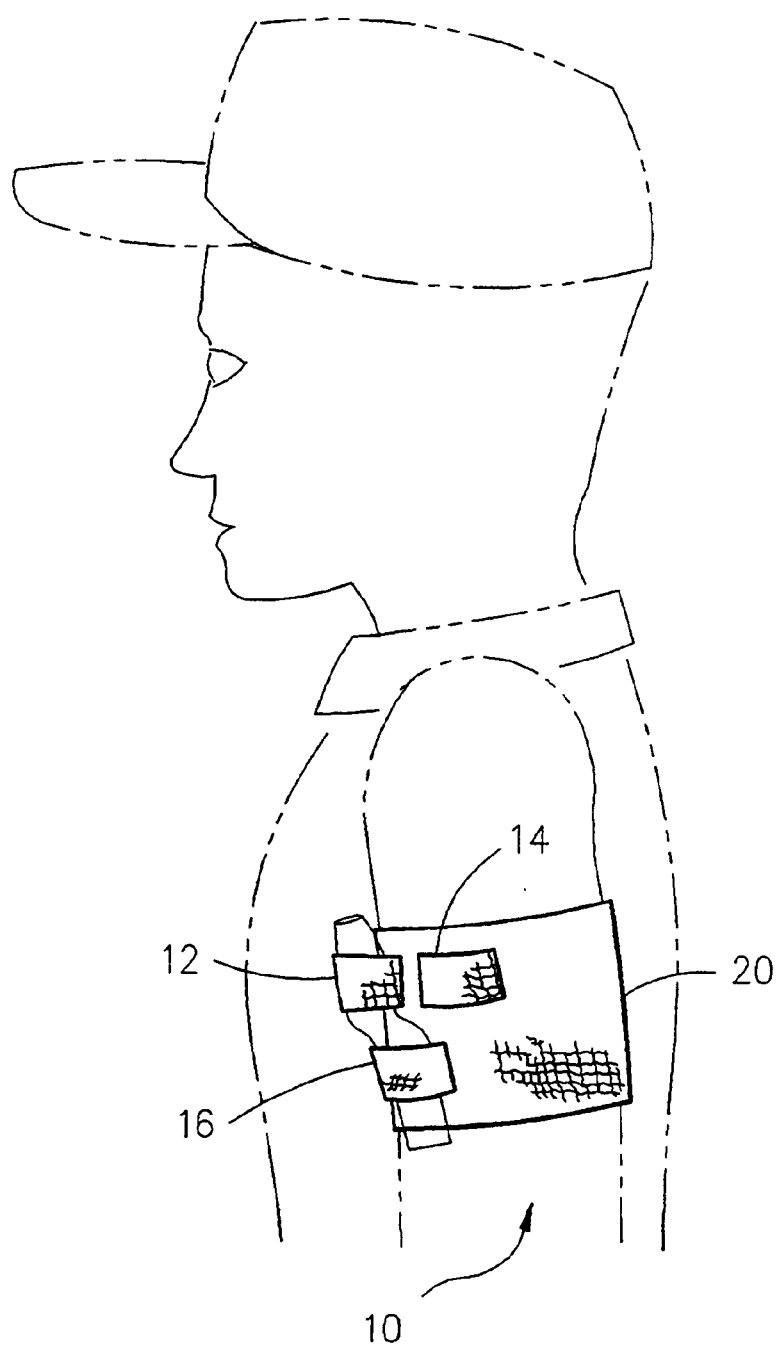
FIG. 2 is a perspective view of the game call holder in position on a hunter's arm.

FIG. 2 shows the game call holder 10 in place on a right-handed hunter's left arm with a game call in place and positioned within the first securing loop 12 and the third securing loop 16. The game call holder 10 is designed for placement on the non-dominant arm which would normally be used for supporting or steadying a weapon as opposed to aiming the weapon or drawing a bow string which would require use of the dominant arm. A left-handed hunter would place the game call holder 10 around his right arm and secure the game call within the second securing loop 14 and the third securing loop 16.

Figure 3:
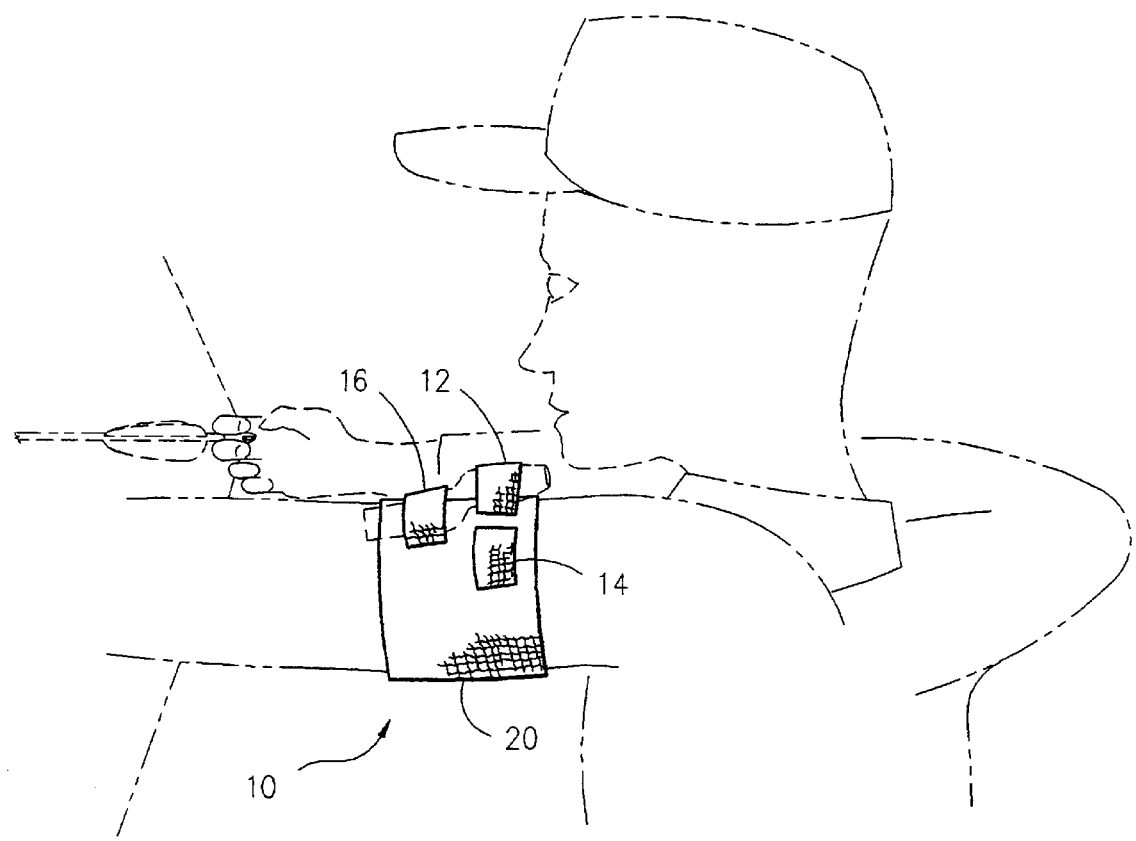
FIG. 3 is a perspective view of game call holder in position as the hunter sights her weapon.

FIG. 3 shows the position of the game call in the first securing loop 12 and the third securing loop 16 as the hunter aims his weapon. The game call is proximate to the hunter's mouth so that the game call can be operated without taking his eyes off the target.

Whereas the present invention has been described in relation to the drawings attached hereto, it should be understood that other and further modifications, apart from those shown or suggested herein, may be made within the spirit and scope of this invention.

What is claimed is:

1. A game call holder comprising:
   (a) a generally annular band having an opening therethrough of a predetermined size for encircling an upper arm of a user, said annular band formed of resilient material having a first edge, a second edge, an inner surface and an outer surface such that the inner surface encircles, and releasably secures said annular band about, the arm of the user, and
   (b) at least one resilient securing loop fastened on the outer surface of said annular band, said at least one securing loop of a predetermined size and configured to operatively receive and secure a tube-shaped game call in close proximity to the user's mouth when said annular band is placed about the user's upper arm.

2. The game call holder of claim 1, wherein said at least one resilient securing loop includes a first securing loop fixed to the outer surface substantially horizontal and parallel to said first edge of the annular band and a second securing loop fixed to the outer surface substantially horizontal and parallel to said second edge of the annular band, said second securing loop offset a predetermined distance from said first securing loop and adapted to receive, in conjunction with said first securing loop, a flexible tube-shaped game call.

3. The game call holder of claim 2 further comprising a third securing loop fixed to said outer surface of the annular band adjacent to the first securing loop and substantially parallel to the first edge of the annular band for ambidextrous receipt of the flexible tube-shaped game call.

4. The game call holder of claim 1 wherein said at least one resilient securing loop includes a first securing loop and a second securing loop fixed to the outer surface of said annular band in predetermined positions in a manner which allows ambidextrous placement of a flexible tube-shaped game call within said at least one securing loop.

5. The game call holder of claim 1, wherein the annular band is provided with sizing means such that the annular band may be tightened about the user's arm.

6. The game call holder of claim 1, wherein the annular band and the at least one securing loop are formed from elastic material.

7. The game call holder of claim 1, wherein the annular band is provided with sizing means configured such that the annular band may be tightened about the user's arm.

8. A game call holder comprising:
   (a) a continuous band having an outer surface, said band constructed of resilient material and configured to operatively encircle and be releasably secured about an upper arm of a user; and
   (b) at least two securing loops, offset from each other, fastened to said outer surface of said band and generally aligned with the user's arm; said at least two securing loops constructed of resilient material and configured to cooperatively and releasably secure, in conjunction with said continuous band, a flexible game call in close proximity to the user's mouth such that the user can operate the game call as the user's arm, encircled by said band, is being used to sight a weapon.

9. The game call holder of claim 8, wherein said at least two securing loops are offset from each other to accommodate a left-handed user.

10. The game call holder of claim 8, wherein said at least two securing loops are offset from each other to accommodate a right-handed user.

11. The game call holder of claim 8, wherein said at least two securing loops are offset from each other to selectively accommodate either a left-handed user or a right-handed user.

* * * * *